United States Patent [19]

Zon et al.

[11] Patent Number: 5,141,996
[45] Date of Patent: Aug. 25, 1992

[54] PREPARATION OF MODIFIED STAR POLYMERS

[75] Inventors: Arie V. Zon; Gerarda J. Klaver, both of Amsterdam, Netherlands

[73] Assignee: Shell Oil Company, Houston, Tex.

[21] Appl. No.: 450,100

[22] Filed: Dec. 13, 1989

[30] Foreign Application Priority Data

Dec. 22, 1988 [GB] United Kingdom ............... 8829896

[51] Int. Cl.$^5$ .................. C08F 279/02; C08F 2/38
[52] U.S. Cl. .................. 525/279; 525/193; 525/258; 525/259; 525/261; 525/263; 525/271
[58] Field of Search ............ 525/279, 280, 258, 261, 525/193, 263, 271, 259

[56] References Cited

U.S. PATENT DOCUMENTS

| | | | |
|---|---|---|---|
| 3,595,942 | 7/1971 | Wald et al. | 525/332.9 |
| 3,632,683 | 1/1972 | Cusano | 525/279 |
| 4,077,893 | 3/1978 | Kiovsky | 252/56 R |
| 4,085,055 | 4/1978 | Durand et al. | 525/279 |
| 4,282,132 | 8/1981 | Benda et al. | 525/280 |
| 4,358,565 | 11/1982 | Eckert | 525/279 |
| 4,409,120 | 10/1983 | Martin | 525/280 |
| 4,490,267 | 12/1984 | Eckert | 525/279 |
| 4,557,849 | 12/1985 | Eckert | 525/280 |
| 4,780,228 | 10/1988 | Gardiner et al. | 525/261 |
| 5,049,294 | 9/1991 | Van Zon et al. | 252/51.5 A |

FOREIGN PATENT DOCUMENTS

| | | |
|---|---|---|
| 0029622 | 6/1981 | European Pat. Off. . |
| 0113138 | 7/1984 | European Pat. Off. . |
| 0171167 | 2/1986 | European Pat. Off. . |
| 1575507 | 9/1980 | United Kingdom . |

OTHER PUBLICATIONS

Sax, Irving and Lewis, Richard, *Howley's Condensed Chemical Dictionary*, p. 713.

Primary Examiner—James J. Seidleck
Assistant Examiner—Vasu S. Jagannathan
Attorney, Agent, or Firm—James O. Okorafor

[57] ABSTRACT

A process for preparing a grafted star polymer which comprises contacting a nitrogen-containing polymerizable organic polar compound with a star polymer (as hereinbefore defined) in the presence of a free radical polymerization initiator and characterized in that the reaction is carried out in a mineral oil solvent and, as coupling inhibitor, either a chain transfer agent, a pi-electron donor, or a comonomer, together with the modified, hydrogenated star polymers thus produced, and their use as luboil additives.

12 Claims, No Drawings

PREPARATION OF MODIFIED STAR POLYMERS

This invention relates to an improved process for the preparation of a grafted hydrogenated star polymer, and to a lubricating oil composition containing the resultant polymer.

U.K. Patent Specification No. 1575507 describes hydrogenated star-shaped polymers comprising a poly-(poly-alkenyl coupling agent) nucleus having outwardly extending therefrom a plurality of hydrogenated polymer chains of one or more conjugated dienes and, optionally, one or more monoalkenyl aromatic compounds, wherein the poly-alkenyl coupling agent has at least two non-conjugated alkenyl groups and no halogen atoms together with the preparation of such polymers by (a) polymerizing one or more conjugated dienes and, optionally, one or more monoalkenyl aromatic compounds, in solution, in the presence of an anionic initiator to form a living polymer, (b) reacting the living polymer with at least 0.5 mole per mole of living polymer of a polyalkenyl coupling agent, having at least two non-conjugated alkenyl groups and no halogen atoms to form a star-shaped polymer, and (c) hydrogenating the star-shaped polymer to form a hydrogenated star-shaped polymer.

European Patent 0029622 describes how the properties of such hydrogenated star-shaped polymers can be improved by grafting with nitrogen containing polymerizable organic compounds, especially 2-vinyl-pyridine or 4-vinylpyridine, together with the preparation of such grafted products by reacting the star polymer and the nitrogen-containing compound in the presence of a free radical initiator and in an inert solvent such as cyclohexane. Further work by the Applicants has now established that this grafting reaction can be carried out more simply in a mineral oil solvent, with particularly useful results being obtained when certain additives are used to reduce shear loss caused by the tendency of the nitrogen-containing compounds to couple with one another.

Accordingly, the present invention provides a process for preparing a grafted star polymer which comprises contacting a nitrogen-containing polymerizable organic polar compound with a star polymer (as hereinafter defined) in the presence of a free radical polymerization initiator; characterized in that the reaction is carried out in a mineral oil solvent and, as coupling inhibitor, either a chain transfer agent, a pi-electron donor, or a comonomer. The term "star polymer" is used herein to designate polymers comprising a nucleus bearing polymeric arms of (i) hydrogenated homopolymers and hydrogenated copolymers of conjugated dienes; or (ii) hydrogenated copolymers of conjugated dienes and mono-alkenyl arenes; or (iii) mixture of (i) and (ii), and wherein at least about 80% of the aliphatic unsaturation of the star-shaped polymer has been reduced by hydrogenation while less than 20% of the aromatic unsaturation has been reduced.

The nucleus of the star polymer is preferably a poly(-polyvinyl aromatic coupling agent), such as poly(divinylbenzene), and suitably bears 4 to 25, especially 5 to 10, polymeric arms. Those polymeric arms are conveniently derived from one or more $C_4$ to $C_{12}$ conjugated dienes, preferably being hydrogenated polybutadiene or polyisoprene chains, and suitably each arm has a number average molecular weight of from 5,000 to 150,000.

The star polymers which are grafted in the present process are generally produced by the following reaction steps:

(i) polymerizing one or more conjugated dienes in solution in the presence of an ionic initiator to form a living polymer;

(ii) reacting the living polymer with a polyvinyl aromatic compound, preferably divinyl benzene, to form a star-shaped polymer; and (iii) hydrogenating the star-shaped polymer to form a hydrogenated star-shaped polymer.

This preparation is described in detail in UK Patent Specification 1575507.

The living polymers produced in reaction step (i) of the above process are the precursors of the hydrogenated polymer chains which extend outwardly from the polyvinyl aromatic nucleus. Preferably each polymeric arm is a hydrogenated polyisoprene homopolymer.

The molecular weights of the star-shaped polymer to be hydrogenated in reaction step (iii) may vary between relatively wide limits. However, an important aspect of the present invention is that polymer possessing good shear stability may be produced even though the polymers have very high molecular weights. It is possible to produce star polymer having peak molecular weights between about 25,000 and about 1,250,000. Preferred molecular weights are 100,000 to 600,000. These peak molecular weights are determined by gel permeation chromatography (GPC) on a polystyrene scale.

In step (iii), the star-shaped polymers are hydrogenated by any suitable technique. Suitably at least 80%, preferably about 90 to about 98%, of the original olefinic unsaturation is hydrogenated. The amount of aromatic unsaturation which is hydrogenated, if any, will depend on the hydrogenation conditions used. However, preferably less than 20%, more preferably less than 5%, of such aromatic unsaturation is hydrogenated.

The molecular weights of the hydrogenated star-shaped polymers correspond to those of the unhydrogenated star-shaped polymers.

The hydrogenation can be carried out as described in UK Patent Specification 1,575,507, the preferred process being the selective hydrogenation process described in U.S. Pat. No. 3,595,942. In that process hydrogenation is conducted, preferably in the same solvent in which the polymer was prepared, utilizing a catalyst comprising the reaction product of an aluminium alkyl and a nickel or cobalt carboxylate or alkoxide. A favoured catalyst is the reaction product formed from triethyl aluminium and nickel octoate.

The hydrogentated star-shaped polymer is then recovered in solid form from the solvent in which it is hydrogenated by any convenient technique such as by evaporation of the solvent. Alternatively, an oil, e.g. a lubricating oil, may be added to the solution and the solvent stripped off from the mixture so formed to produce concentrates. Easily handleable concentrates are produced even when the amount of hydrogenated star-shaped polymer therein exceeds 10%. Suitable concentrates contain from 10 to 25% w of the hydrogenated star polymer.

The nitrogen-containing organic polar compound is preferably a polymerizable nitrogen-containing heterocyclic compound selected from the group consisting of piperidine, morpholine, piperazine, pyridine, pyrrolidone, pyrrole, benzopyrrole, quinoline, indole, which are all alkenyl-substituted and 2-methyl vinylpyridine and N-vinylimidazole. Of the polar compounds 2-vinylpyridine and 4-vinylpyridine are most preferred.

The free radical initiator may be any of those compounds known for this purpose in graft polymerization, tert. butyl hydroperoxide, tert. butyl perbenzoate and di-tert. butyl peroxide generally being convenient materials. The mineral oil reaction medium is preferably a high viscosity index mineral oil such as HVI 60 having a commerical product of kinematic viscosity (100° C.) 4.73 cSt.

The coupling inhibitor is, according to the present invention, present in order to inhibit the tendency of the grafting process to increase the shear loss properties of the final product, which is believed to arise mainly from a coupling side reaction between two nitrogen-containing polar (e.g. 4-vinyl pyridine) star shaped molecules. Suitable coupling inhibitors are chain transfer agents, i.e. compounds containing an active hydrogen atom such as long chain alkyl mercaptans, especially tert. dodecyl mercaptan; pi-electron donor molecules such as anisole; or comonomers such as N-vinylpyrrolidone.

The amount of nitrogen-containing compound grafted onto the star polymer is suitably between 1 and 20, preferably 2 to 12 and especially 4.5, % m/m, based on star polymer, whilst the amount of coupling inhibitor is dependent on the nature of the inhibitor selected. In the case of tert. dodecyl mercaptan, the amount is suitably between 0.1 and 2% m/m, preferably between 0.25 and 1.0% m/m. In the case of anisole somewhat higher amounts are appropriate, 5 to 15 and especially 9% m/m being preferred. In the case of a comonomer, such as N-vinylpyrrolidone, an amount between 1 and 10%, especially 2–3% m/m, is preferred, all amounts based on star polymer.

The process for preparing the grafted hydrogenated star polymers may be carried out at a temperature between 70° to 180° C., but is preferably between 110° and 130° C., with grafting at 120° C. giving optimal results in respect of the shear loss characteristics of the final product. A convenient practical compromise between a short reaction time (requiring a higher reaction temperature) and satisfactory shear loss characteristics (optimal at 120°) can be attained by an initial reaction at 120° C. (e.g. for the first hour), followed by gradual heating to 130° C. (e.g. over 1–2 hours), concluding with several hours at 130° C. The amount of free radical polymerization initiator is suitably chosen to balance the production of the necessary grafting sites on the star polymer and thereby the number of grafted chains, and the chain-length of the grafted chains, amounts within the range of 1 to 10% m/m, generally 2.0% m/m on polymer, being generally suitable. In some cases, it may be convenient to dose both the free radical initiator and the grafting monomer gradually through the course of the reaction. In order to minimize undesirable side reactions, the process is preferably carried out under an inert atmosphere, conveniently nitrogen, with pressures between 1 and 50 bars being selected according to the constraints of the apparatus in use.

The grafted polymers of this invention are of particular value as additives for lubricating oils, functionalizing as viscosity index improvers. Hence a further embodiment of the invention provides a lubricating oil composition comprising a minor proportion, suitably from 0.15 to 20% w, of the grafted star polymer. For convenience of formulation, it is often useful to incorporate the grafted polymer in the form of a luboil concentrate containing from 5 to 50% w of the polymer.

The invention is further illustrated in the following Examples, of which numbers 1–6 are included for comparative purposes.

EXAMPLE 1

Following the procedure described in U.S. Pat. No. 4,077,893 there was prepared a star-shaped polymer, having hydrogenated polyisoprene arms having a number average molecular weight of 35,000 coupled with divinylbenzene ("Shellvis" 200). This was taken up in HVI-oil Brent 60 to form a 13.6% w concentrate.

2595 g of the concentrate was charged into a 5 liter stainless steel reactor fitted with a mechanical stirrer, gas inlet tube, manometer, thermometer and heating/cooling device.

The polymer solution was heated to 90° C. in the meantime replacing the air by nitrogen. As soon as the oxygen content in the reactor amounted to less than 100 ppm the concentrate was heated to 120° C. A 20% w oxygen free solution of 15.88 g of 4-vinyl pyridine in HVI-oil Brent 60 was added to the polymer solution, followed after a few minutes of mixing by a 50% w oxygen-free solution of 9.53 g of TRIGONOX C (=75% w of tert. butylperbenzoate in oil) in HVI-oil 60.

Heating and stirring were continued for 18 hours to yield the desired grafted star polymer as a concentrate in the HVI-oil reaction medium.

EXAMPLES 2–6

Procedures similar to those of Example 1 were used to prepare further products, the detailed reaction conditions being varied as follows:

| Example 2 | Reaction at 130° C. |
|---|---|
| Example 3 | Reaction at 110° C. |
| Example 4 | Reaction at 120° C. for 1 hour, 120–130° C. for 2 hours, 130° C. for 4 hours. |
| Example 5 | Reaction at 120° C., but half amount of initiator |
| Example 6 | Reaction at 120° C., but 4-vinyl pyridine and initiator added in 2 equal portions at 0 hours and 3 hours. |

EXAMPLES 7–11

The general procedure of Example 1 was followed, but employing additionally a coupling inhibitor according to the present invention, the nature and amount of coupling inhibitor being set out in Table I.

Table I records also the relevant performance parameters on the products of each example (Examples 1–6 being included for comparative purposes) as determined after formulation into a 10W40 oil at 1.1% m/m polymer content. For further comparison, Example S denotes the comparable properties determined on the ungrafted hydrogenated star polymer ("Shellvis" 200).

TABLE 1

| Example No. | *Coupling Inhibitor | **Relative Shear Loss | Kinematic Viscosity (100° C.) (c St) | Sequence VD Engine Test Results[x] | | |
|---|---|---|---|---|---|---|
| | | | | AES | AEV | PSV |
| 1 | — | 1.18 | 14.6 | 9.64 | 7.06 | 7.29 |
| 2 | — | 1.60 | 14.8 | nd | nd | nd |
| 3 | — | 1.45 | 14.8 | nd | nd | nd |
| 4 | — | 0.96 | 14.8 | nd | nd | nd |
| 5 | — | 0.66 | 14.2 | nd | nd | nd |
| 6 | — | 1.05 | 14.6 | 9.63 | 7.2 | 7.18 |
| 7 | A 9% | 0.85 | 14.4 | nd | nd | nd |
| 8 | M 1.0% | 0.63 | 13.8 | nd | nd | nd |
| 9 | M 0.5% | 0.57 | 13.9 | 9.54 | 6.7 | 7.23 |
| 10 | M 0.25% | 0.61 | 14.0 | 9.49 | 7.05 | 7.42 |
| 11*** | NVP 2.25% | 0.71 | 14.4 | 9.58 | 7.61 | 7.24 |
| S | — | 0.25–0.28 | 13.7 | 9.54 | 5.33 | 7.14 |

*Coupling Inhibitor: A = anisole; M = tert dodecyl mercaptan; NVP = N-vinyl pyrrolidone.
**Shear Loss expressed as relative to "Shellvis" 250, determined in a 10W40 formulation of DIN 51382.
***In Example No. 11 half the amount of 4-vinylpyridine, used in Example No. 1, was employed.
[x]AES = average engine sludge; AEV = average engine varnish; PSV = piston skirt varnish (ratings 0–10; 10 = clean).

We claim:

1. A process for preparing a grafted star polymer having improved shear stability which comprises contacting a nitrogen-containing polymerizable organic polar compound with a star polymer comprising a poly(divinylbenzene) nucleus bearing 4 to 25 polymeric arms each of which arms have a number average molecular weight of from 5,000 to 150,000; in the presence of a free radical polymerization initiator and characterized in that the reaction is carried out in a mineral oil solvent with a coupling inhibitor selected from the group consisting of anisole, tert-dodecyl mercaptan, and N-vinyl pyrrolidone; wherein said coupling inhibitor is present in an amount of from about 0.25 to 9 wt %.

2. A process as in claim 1 wherein said coupling inhibitor comprises tert dodecyl mercaptan and N-vinyl pyrrolidone.

3. The process as in claim 1 wherein the nitrogen-containing polymerizable organic polar compound is a nitrogen-containing heterocyclic compound selected from the group consisting of piperidine, morpholine, piperazine, pyridine, pyrrolidone, pyrrole, benzopyrrole, quinoline, indole, which are all alkenyl-substituted, 2-methylvinylpyridine and N-vinylimidazole.

4. The process as claimed in claim 3 wherein the heterocyclic compound is 2-vinylpyridine or 4-vinylpyridine.

5. The process as claimed in claim 1 wherein the free radical polymerization initiator is tert. butyl perbenzoate or di-tert. butyl peroxide.

6. The process as claimed in claim 1 wherein the star polymer comprises a poly(divinylbenzene) nucleus bearing 5 to 10 arms of hydrogenated polyisoprene.

7. The process as claimed in claim 1 wherein the mineral oil is a high viscosity index mineral oil.

8. The process as claimed in claim 1 wherein the amount of nitrogen-containing polar compound is between 1 and 20% m/m and the amount of coupling inhibitor is between 0.1 and 2% m/m for a chain transfer agent, between 5 and 15% m/m for a pi-electron donor, or between 1 and 10% m/m for a comonomer, all amounts based on star polymer.

9. A grafted hydrogenated star polymer prepared by the process of claim 1.

10. A lubricating oil composition comprising as a minor portion a polymer prepared by the process of claim 1.

11. A lubricating oil composition as in claim 10, wherein the amount of polymer is from 0.15 to 20% wt based on the weight of the composition.

12. An oil concentrate comprising from 5 to 50% wt of a polymer prepared by the process of claim 1.

* * * * *